H. G. BLANKFORT.
DUMP CART.
APPLICATION FILED JUNE 8, 1915.
1,192,979.
Patented Aug. 1, 1916.
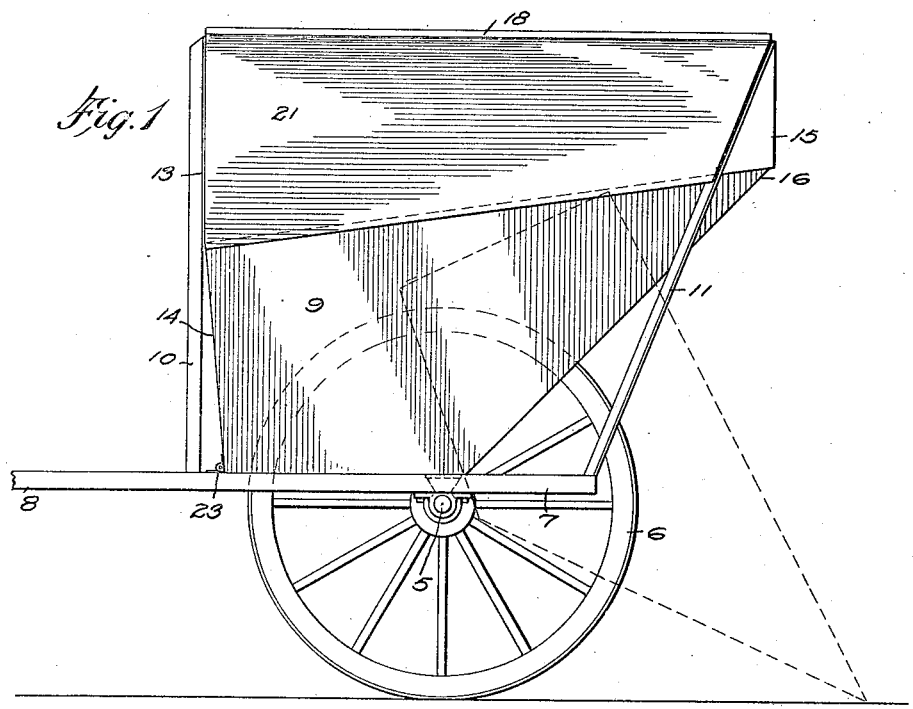
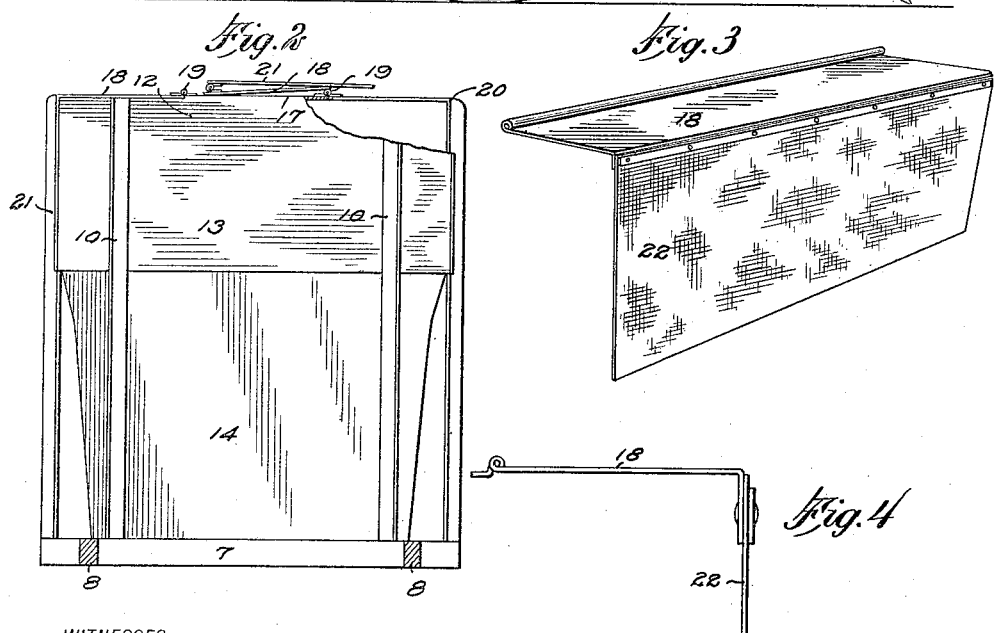
WITNESSES
F. D. Sweet
E. B. Marshall
INVENTOR
Herbert G. Blankfort
BY
ATTORNEYS

UNITED STATES PATENT OFFICE.

HERBERT G. BLANKFORT, OF NEW YORK, N. Y., ASSIGNOR OF ONE-HALF TO LESSER WOLF, OF NEW YORK, N. Y.

DUMP-CART.

1,192,979.  Specification of Letters Patent.  Patented Aug. 1, 1916.

Application filed June 8, 1915. Serial No. 32,885.

*To all whom it may concern:*

Be it known that I, HERBERT G. BLANK-FORT, a citizen of the United States, and a resident of the city of New York, in the borough of Brooklyn, county of Kings, and State of New York, have invented a new and Improved Dump-Cart, of which the following is a full, clear, and exact description.

My invention has for its object to provide a dump cart which may be used for ashes and garbage, the dump cart being provided with an inclosing cover which permits the body to rotate on its axis, while the inclosing cover remains stationary.

Additional objects of the invention will appear in the following specification in which the preferred form of my invention is disclosed.

In the drawings similar reference characters refer to similar parts in all the views in which—

Figure 1 is a side elevation of my dump cart; Fig. 2 is a front elevation of Fig. 1; Fig. 3 is a perspective view showing a modified form of a curtain for the cart cover; and Fig. 4 is an end view of the construction illustrated in Fig. 3.

By referring to the drawings it will be seen that a dump cart is provided with an axle 5 on which the wheels 6 are mounted, a frame 7 being pivoted to the axle 5 at the inner sides of the wheel 6, the shafts 8 extending from the forward ends of the said frame. Between the sides of the said frame 7, the cart body 9 is pivoted to the axle 5.

The frame 7 has vertically extending members 10 and 11 which serve to support the cover 12, this cover 12 having a forward vertical member 13 which extends upwardly from the forward end 14 of the cart body 9 when the cart body 9 is in normal position as shown in Fig. 1 of the drawings. The cover 12 also has a vertically extending member 15 at its rear which is disposed upwardly from the rear end 16 of the cart body 9. The lower end of the member 13 of the cover 12 is disposed in front of the upper end of the forward portion 14 of the cart body 9 so that when the cart body 9 rotates rearwardly, the cover member 13 will not interfere with the said movement. The forward and rear members 13 and 15 of the cover are connected at their upper portions by a horizontally extending portion 17, the sides of which are preferably spaced from the sides of the frame so that those using the dump cart may conveniently dump the contents of barrels into the cart.

To the sides of the horizontal portions 17 of the cover there are pivoted curtains 60 which, with the front and rear portions 13 and 15 of the cover and the horizontal portions, serve to completely inclose the top of the cart body 9 when the said cart body is in normal position as illustrated in Fig. 1 of the drawings. In Fig. 2 I illustrate one form of the curtains which have members 18 which are preferably constructed of metal and which are hinged at 19 to the sides of the horizontal portions 17 of the cover. These portions 18 are of sufficient length to extend to 20 for forming a continuation of the horizontal portions 17 of the cover. To each of the members 18 there is pivoted a member 21 which is preferably constructed of metal and which serves to inclose the side of the cover and which has its lower edge extending at the outer side of the upper portions of the sides of the dump cart. When the members 18 of the cover are disposed horizontally at the outer sides of the horizontal portions 17 of the cover, the members 21 will depend therefrom and the sides of the dump cart will be completely inclosed thereby.

If desired, instead of using the metal plate 21, I may make use of a piece of canvas such as illustrated at 22 in Figs. 3 and 4 of the drawings, this piece of canvas 22 serving as a side of the cover in place of the metal plate 21. The cart body 9 is held in normal position on the frame by the usual means 23.

It will be seen that the top of the dump cart body 9 extends upwardly rearwardly, so that it will not interfere with the cover when it is rotated rearwardly. It will also be seen that the bottom of the dump cart body 9 at the rear of the axle extends upwardly so that the weight of the material in the dump cart body 9 will tend to hold the dump cart body 9 in normal position, as illustrated in Fig. 1 of the drawings.

Having thus described my invention I claim as new and desire to secure by Letters Patent:

1. In a dump cart, a frame, a cart body rotatably mounted on the frame, with its top extending rearwardly and upwardly when the cart body is in normal position, the bottom of the cart body at the rear of its pivot extending upwardly and rearwardly, and a cover for the cart body secured relatively to the frame and normally inclosing the top of the cart body.

2. In a dump cart, a frame, a cart body rotatably mounted on the frame and with its top from front to rear extending upwardly when the cart body is in normal position, and a cover for the cart body normally inclosing the top of the cart and secured to the frame for remaining in position relatively thereto when the cart body is rotated.

3. In a dump cart, a frame, a cart body rotatably mounted on the frame, and a cover for the cart body extending upwardly from the top of the front and the rear of the cart body and secured to the frame for remaining in position relatively thereto when the cart body is rotated.

4. In a dump cart, a frame, a cart body rotatably mounted on the frame with its top extending rearwardly and upwardly when the cart body is in normal position, a cover for the cart body mounted on the frame, the cover having forward and rearward vertical portions which extend upwardly from the forward and rear ends of the cart body when the latter is in normal position, the upper portions of the said forward and rearward vertical portions of the cover being connected by a horizontal portion of the cover, and sides for the cover disposed at the outer sides of the cart body.

5. In a dump cart, an axle, wheels mounted on the axle, a cart body pivoted to the axle normally disposed with its top extending rearwardly and upwardly, a cover for the cart body, means for supporting the cover above the cart body, the cover having forward and rearward vertical portions which extend upwardly from the forward and rear ends of the cart body when the latter is in normal position, the upper portions of said forward and rearward vertical portions of the cover being connected by a horizontal portion of the cover, and sides for the cover disposed at the outer sides of the dump cart body.

6. In a dump cart, a frame, a cart body rotatably mounted on the frame and having its top extending upwardly and rearwardly when the cart body is in normal position, a cover for the cart body mounted on the frame, the cover having forward and rearward vertical portions which extend upwardly from the forward and rear ends of the cart body when the latter is in normal position, the upper portions of the said forward and rearward vertical portions of the cover being connected by a horizontal body portion of the cover, sides for the cover having portions hinged to the said body for extending outwardly therefrom, and additional side portions hinged to the first-mentioned side portions for depending therefrom.

In testimony whereof I have signed my name to this specification in the presence of the two subscribing witnesses.

HERBERT G. BLANKFORT.

Witnesses:
EVERARD B. MARSHALL,
GEORGE H. EMSLIE.

Copies of this patent may be obtained for five cents each, by addressing the "Commissioner of Patents, Washington, D. C."